July 9, 1963    A. J. VISSER    3,096,593
CITY GLOBE
Filed Nov. 16, 1960
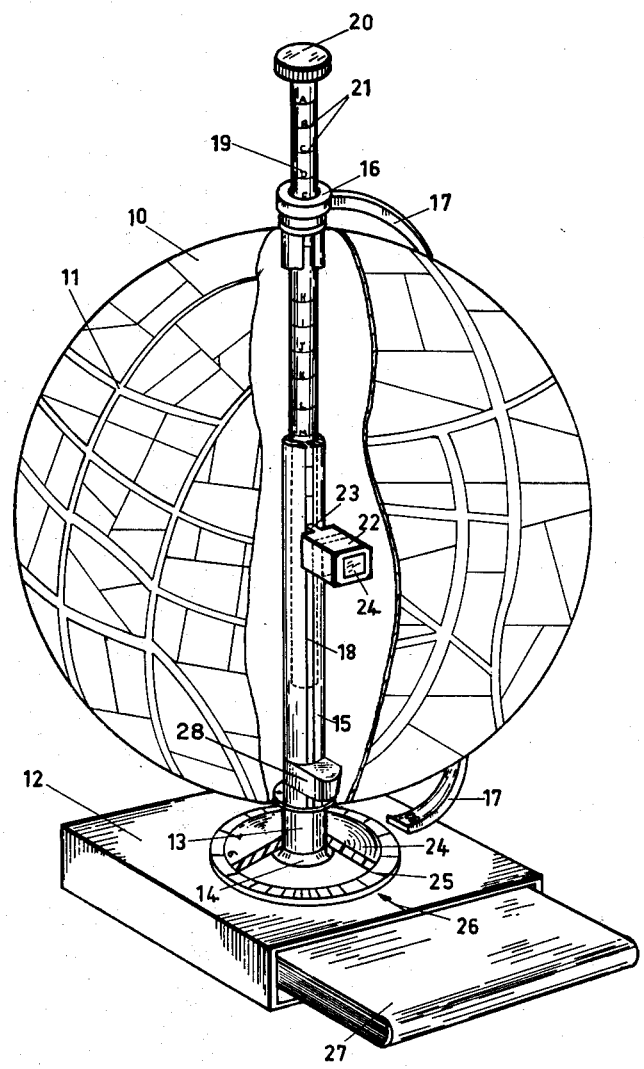
INVENTOR

United States Patent Office 3,096,593
Patented July 9, 1963

3,096,593
CITY GLOBE
Andrew J. Visser, 3440 Sherbrooke E., Apt. 2,
Montreal, Quebec, Canada
Filed Nov. 16, 1960, Ser. No. 69,583
2 Claims. (Cl. 35—46)

This invention relates to improvements in city maps and the like and more particularly to improvements in reference maps wherein the location of streets, hospitals and the like are given as a grid reference.

It is conventional practice to utilize flat maps having grid lines drawn thereon in combination with a key giving the map reference of streets, points of interest and the like, these having the disadvantages that they require a large amount of flat space and grid lines may be confused with street lines, boundaries and the like. Also, upon being utilized in places such as hotel foyers and the like, where they may be referred to by many out-of-town visitors, they become quickly and easily soiled and detract from the appearance of their surroundings.

It is an object of this invention to provide a city globe that will enable a person to find a point of reference quickly and easily.

It is another object of this invention to provide a city globe which will illuminate the required point of reference.

It is a further object of this invention to provide a city globe that will combine an attractive appearance with great utility, especially in places such as hotels, libraries and information centres.

It is still another object of this invention to provide a city globe that is translucent and internally illuminated at a lower intensity than the reference spotlight.

It is still another object of this invention to provide a city globe which, in combination with a reference book, will enable a person to quickly locate a number of places more easily than with the ordinary grid reference map.

These and other objects and features of the invention will become apparent when taken in conjunction with the accompanying drawing in which:

The FIGURE is a perspective view of a city globe embodying the invention having a portion cut away to reveal the internal lighting and mechanism.

Referring to the FIGURE, a translucent globe 10, upon the surface of which is inscribed a detailed city map 11 is rotatably mounted upon a base 12 and held in spaced apart relationship therewith by a tubular pedestal 13. Pedestal 13 is flangeably attached to the lowest portion of globe 10 and is rotatably supported on base 12 by a conventional bearing 14. A centre spindle 15 is attached to and extends substantially vertically from the upper face of base 12 and, passing through pedestal 13, comprises the vertical axis of globe 10. A bearing 16 is located between the upper end of spindle 15 and the upper surface of globe 10. A semi-circular rigid strap 17 extends from base 12 in parallel spaced apart relationship with globe 10 to the upper part of spindle 15 thereby acting as a support thereto.

Spindle 15 is hollow and a vertical slot 12 is formed therein and extends the full length thereof.

A centre shaft 19 is a close sliding fit within spindle 15 and is adapted to extend vertically upwardly from spindle 15 in any selected position by means of the manual operation of a knurled knob 20 integrally attached thereto.

A plurality of graduation marks 21 in parallel, spaced apart relationship are inscribed around the circumference of shaft 19, each being given a distinctive alphabetical letter and arranged in correct alphabetical sequence starting from the uppermost mark 21 as letter A.

A box-like structure 22 is attached to shaft 19, inside globe 10, through a tongue portion 23 adapted to slide freely in slot 18 in spindle 15. Box 22 houses a light bulb and an outwardly facing aperture 24 permits high intensity light from within box 22 to be directed on to a confined area of the surface of globe 10.

It may be seen that the vertical location of box 22 is controlled by the position of shaft 19 relative to spindle 15, and the height of box 22 within globe 10 may be designated with reference to a mark 21 against a datum point of, say, the upper surface of bearing 16.

A disc 24 extends outwardly from the base of pedestal 13, adjacent the upper surface of base 12. A plurality of equally spaced, radial, lines 25 are inscribed around the perimeter of disc 24, each line 25 being given a distinctive number in correct numerical sequence.

A datum mark 26 is inscribed on the upper surface of base 12 and is adapted to be in radial alignment with any one of lines 25.

It may be seen that the longitudinal position of the light beam from box 22 in relation to map 11 may be determined by rotating globe 10 until a desired number on disc 25 is in alignment with datum point 26, and the desired latitudinal position of the light from box 22, as previously explained, may be determined by the alignment of marks 21 with the upper surface of bearing 16.

A reference book 27 is provided with the globe assembly and lists all city streets, places of interest and the like by means of a numerical and alphabetical grid reference.

Thus, upon obtaining a grid reference of say, 17E for the City Hospital, a person meerly turns globe 10 until a line 25 marked 17 is in alignment with datum mark 26 and, grasping knob 20, aligns the mark bearing the letter E on shaft 19 with the upper surface of bearing 16 and the light emitted from box 22 thereupon illuminates the area of the city map 11 in which the hospital is located.

The light emitting from box 22 may be on at all times or may be selectable by a push button or the like. As an aid to legibility of the globe as a whole, the interior of globe 10 may be illuminated from light source 28 with a softer light than that emitted from box 22. The said softer light device may be conventionally attached to the middle part of the centre spindle opposite the slotted side.

The general design of the individual parts of the invention as explained above may be varied according to requirements in regards to manufacture and production thereof, while still remaining within the spirit and principle of the invention, without prejudicing the novelty thereof.

The embodiments of the invention in which an exclusive property or privilege is claimed are defined as follows:

1. A city globe comprising a hollow translucent globe with a city map imprinted thereon; a pedestal for the said globe rigidly attached between the lower portion of the globe and a disc; said disc having imprinted numbered radial lines thereon; a base with one datum mark imprinted thereon; a centre spindle having a longitudinal slot running its entire length and protruding from said base to the top of the globe; said globe, pedestal and disc rotatable about the centre spindle; a centre shaft in close sliding fit within the spindle shaft with a plurality of alphabetical graduation marks inscribed around the circumference of said centre shaft; said centre shaft adapted to extend vertically upwards or downwards by means of a manually controlled knurled knob; said centre shaft having attached thereto a narrow squared grid high intensity light beam device fitted through the said slot in the centre spindle; said light to move up or down in conjunction with said centre shaft when turned by means of the knurled knob; a rigid semi-circular reinforcing strap having substantially larger curvature than the globe attached to the top of the said centre spindle and to the said base.

2. A city globe as claimed in claim 1 including means for evenly illuminating said globe to an intensity substantially less than that of said beam.

References Cited in the file of this patent
UNITED STATES PATENTS
2,138,959  Cutting et al. _____ Dec. 6, 1938